US007869232B2

(12) United States Patent
Nagata et al.

(10) Patent No.: US 7,869,232 B2
(45) Date of Patent: Jan. 11, 2011

(54) ELECTRIC POWER CONVERTER SUPPRESSING OUTPUT VOLTAGE VARIATION DUE TO INPUT VOLTAGE FLUCTUATION

(75) Inventors: Koichiro Nagata, Mito (JP); Toshiaki Okuyama, Tokai (JP); Shigetoshi Okamatsu, Hitachinaka (JP); Koichi Miyazaki, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 633 days.

(21) Appl. No.: 11/842,988

(22) Filed: Aug. 22, 2007

(65) Prior Publication Data

US 2008/0088291 A1 Apr. 17, 2008

(30) Foreign Application Priority Data

Oct. 16, 2006 (JP) .............................. 2006-280871

(51) Int. Cl.
*H02M 5/458* (2006.01)
*H02M 7/5395* (2006.01)
(52) U.S. Cl. ............................ 363/37; 363/97; 363/131
(58) Field of Classification Search ............. 363/34–37, 363/97, 98, 131, 132
See application file for complete search history.

(56) References Cited

U.S. PATENT DOCUMENTS

| 5,949,664 | A | * | 9/1999 | Bernet et al. | 363/37 |
| 5,969,957 | A | * | 10/1999 | Divan et al. | 363/36 |
| 6,031,737 | A | * | 2/2000 | Green | 363/37 |
| 6,687,139 | B2 | * | 2/2004 | Tanikawa et al. | 363/37 |
| 7,091,690 | B1 | | 8/2006 | Oka et al. | |
| 7,113,414 | B2 | * | 9/2006 | Matsushiro et al. | 363/37 |
| 2003/0142517 | A1 | * | 7/2003 | Furukawa et al. | 363/37 |
| 2006/0044848 | A1 | * | 3/2006 | Suzuki et al. | 363/37 |

FOREIGN PATENT DOCUMENTS

JP         3573028         7/2004

* cited by examiner

*Primary Examiner*—Jeffrey L Sterrett
*Assistant Examiner*—Fred E Finch, III
(74) *Attorney, Agent, or Firm*—Antonelli, Terry, Stout & Kraus, LLP.

(57) ABSTRACT

An electric power converter apparatus having a function of converting a power source voltage into an AC voltage having an arbitrary frequency and maintaining an output voltage constant even on the power source variation, in which the electric power converter apparatus decreases the output voltage when the output voltage drops to equal to or less than a predetermined value, afterward, increases the output voltage in response to a predetermined rate of change when the power source voltage rises.

16 Claims, 9 Drawing Sheets

PRESENT INVENTION
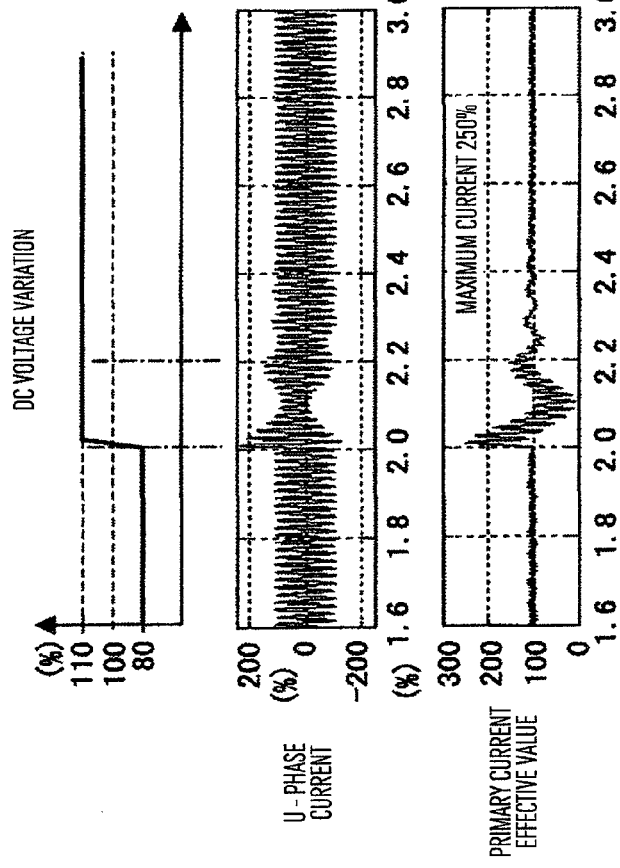
FIG.4A
CONVENTIONAL

OUTPUT VOLTAGE IS NOT SATURATED

OUTPUT VOLTAGE IS SATURATED

ELECTRIC POWER CONVERTER SUPPRESSING OUTPUT VOLTAGE VARIATION DUE TO INPUT VOLTAGE FLUCTUATION

BACKGROUND OF THE INVENTION

The present invention relates to an electric power converter apparatus to convert a power source voltage into an AC voltage having an arbitrary frequency according to a reference voltage, and particularly to a voltage control technique in the case where the power source voltage varies in a variable speed operation of an electric motor.

For example, an electric power converter apparatus to drive an electric motor as a related example will be described with reference to FIG. 8. In FIG. 8, a three-phase alternating voltage supplied from a commercial power source 1 is rectified by a diode unit 2 and smoothed by a smoothing capacitor 3, so that it is converted to a DC voltage Vdc. The Vdc is converted into an AC voltage by an inverter unit 4. An output voltage from the inverter unit is then applied to an electric motor 7 to rotate it. Other means for controlling the inverter unit 4, a reference voltage operating unit 8 calculates an output reference voltage V* in response to a desired speed command value by using a detected current IFB and detected voltage VFB supplied from a current detector 5 and voltage detector 6, respectively. Further, a gate pulse generation unit 9 compares, for example, a reference voltage with a carrier waveform to generate a PWM (pulse width modulation) gate pulse, so that switching devices in the inverter unit 4 are subject to on-off control. The output voltage of inverter unit is therefore proportional to a product of the reference voltage value and DC voltage. Here, when the voltage of commercial power source 1 varies, the DC voltage Vdc is varied, and the inverter unit output voltage is affected by the variation to possibly cause a problem such as an excess current. Therefore, Japanese Patent No. 3573028 has been proposed as related art that the reference voltage V* is corrected in response to the variations of power source and Vdc to suppress the variation of the inverter output voltage. This makes the reference voltage value large when the voltage drops, and also makes the reference voltage value small when the voltage rises, thereby suppressing the affection caused by the Vdc variation and attempting to maintain the inverter output voltage constant approximately.

SUMMARY OF THE INVENTION

However, according to the related system, as the voltage drops on the power source variation, the reference voltage value becomes large. In the case where the voltage drop is small, the reference voltage value is smaller than a carrier amplitude as shown in FIG. 9A, and a gate pulse is generated by the gate pulse generation unit 9 in accordance with the relation of magnitude between the reference voltage value and carrier amplitude. The output voltage therefore becomes a PWM waveform as shown in FIG. 9A. In the case where the voltage drop is significantly large and the corrected reference voltage value becomes larger than the carrier amplitude as shown in FIG. 9B, the inverter output voltage becomes saturated. In this way, in the case of a square wave shaped voltage, a basic wave component contained in the output voltage is 1.27 times the square wave amplitude though the component becomes maximum, and the output voltage having more than the value cannot be produced. In the case where the output voltage is in the condition of saturation as described above, the inverter output voltage becomes dropped. Further, pulsation of an electric motor torque occurs possibly if the output voltage is near to a square wave.

Next, in this condition described above, if the power source voltage rises (or returns), the reference voltage value is decreased in response to the amount of voltage increase in the case of related system. For this reason, the output voltage becomes tolerably a desired reference voltage value. However, the output voltage becomes a precipitous variation (rises in this case) from the dropped condition at this time. Therefore, a large amount of current could be flown by causing its potential difference (a difference between the returned output voltage and the inner voltage which has been dropped in the electric motor).

An object of the invention is to provide an electric power converter apparatus in which a voltage is output continuously, an excess current and torque pulsation of an electric motor are prevented, and an electric motor is driven stably.

According to an aspect of the invention, the present invention provides an electric power converter apparatus having a function of converting a power source voltage into an AC voltage having an arbitrary frequency and maintaining an output voltage constant even on the power source variation, in which the output voltage is decreased when the output voltage drops to equal to or less than a predetermined value, afterward, the output voltage is increased in response to a predetermined rate of change when the power source voltage rises.

According to the invention, it is advantageous that the output voltage is varied continuously, a torque pulsation and excess current of the electric motor are prevented, and the electric motor is driven stably even when the power source voltage varies precipitously and largely in driving the electric motor.

Other objects, features and advantages of the invention will become apparent from the following description of the embodiments of the invention taken in conjunction with the accompanying drawings.

BRIEF DESCRIPTION OF THE DRAWINGS

FIGS. 4A and 4B are simulated waveforms showing advantages of the invention in comparison with related art;

DESCRIPTION OF THE EMBODIMENTS

Embodiments of the invention will be described below with the reference to the drawings in detail.

Embodiment 1

Figure 1:
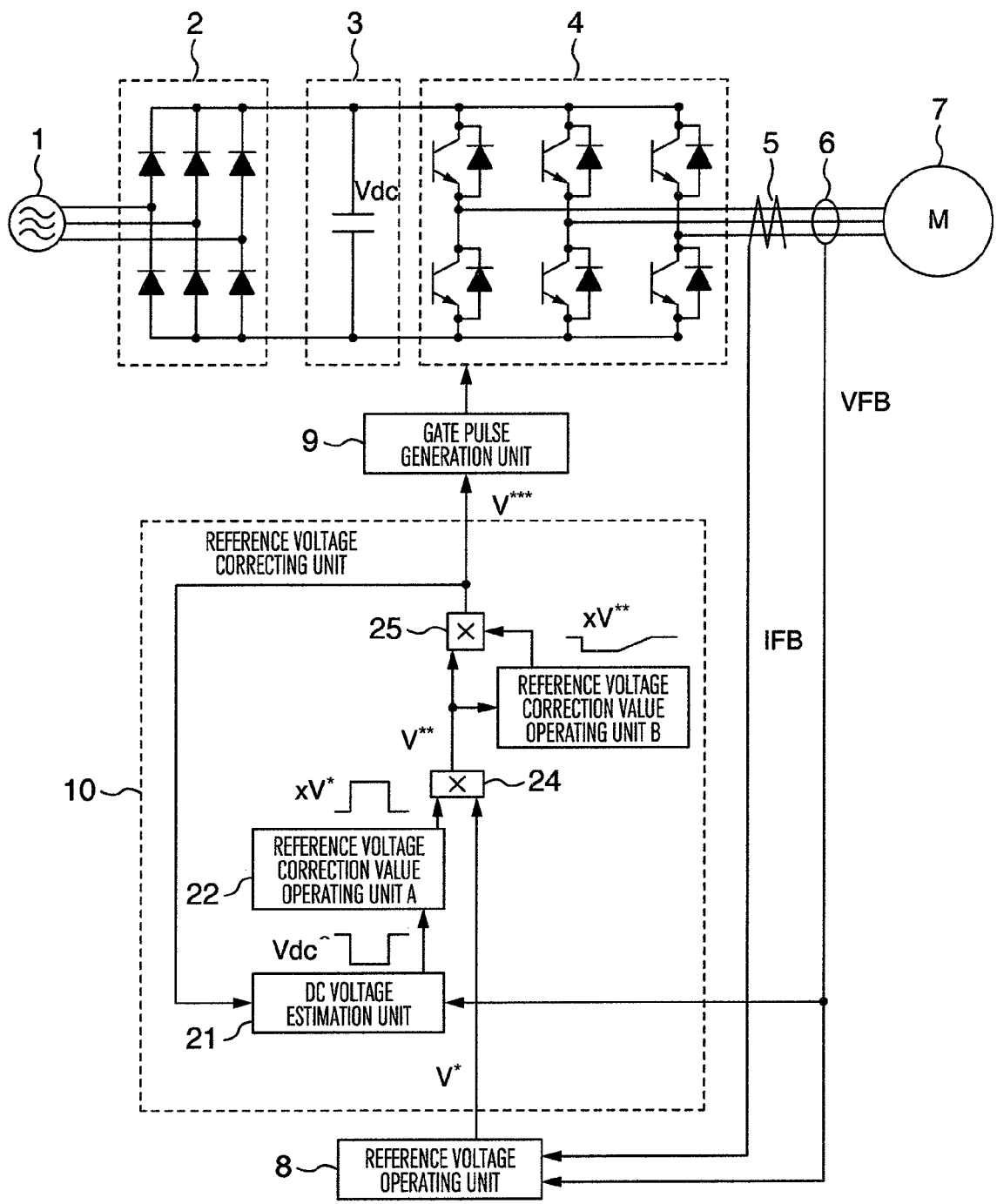
FIG. 1 is a constitutional diagram of an electric power converter apparatus in the first embodiment of the invention.
Figure 2:
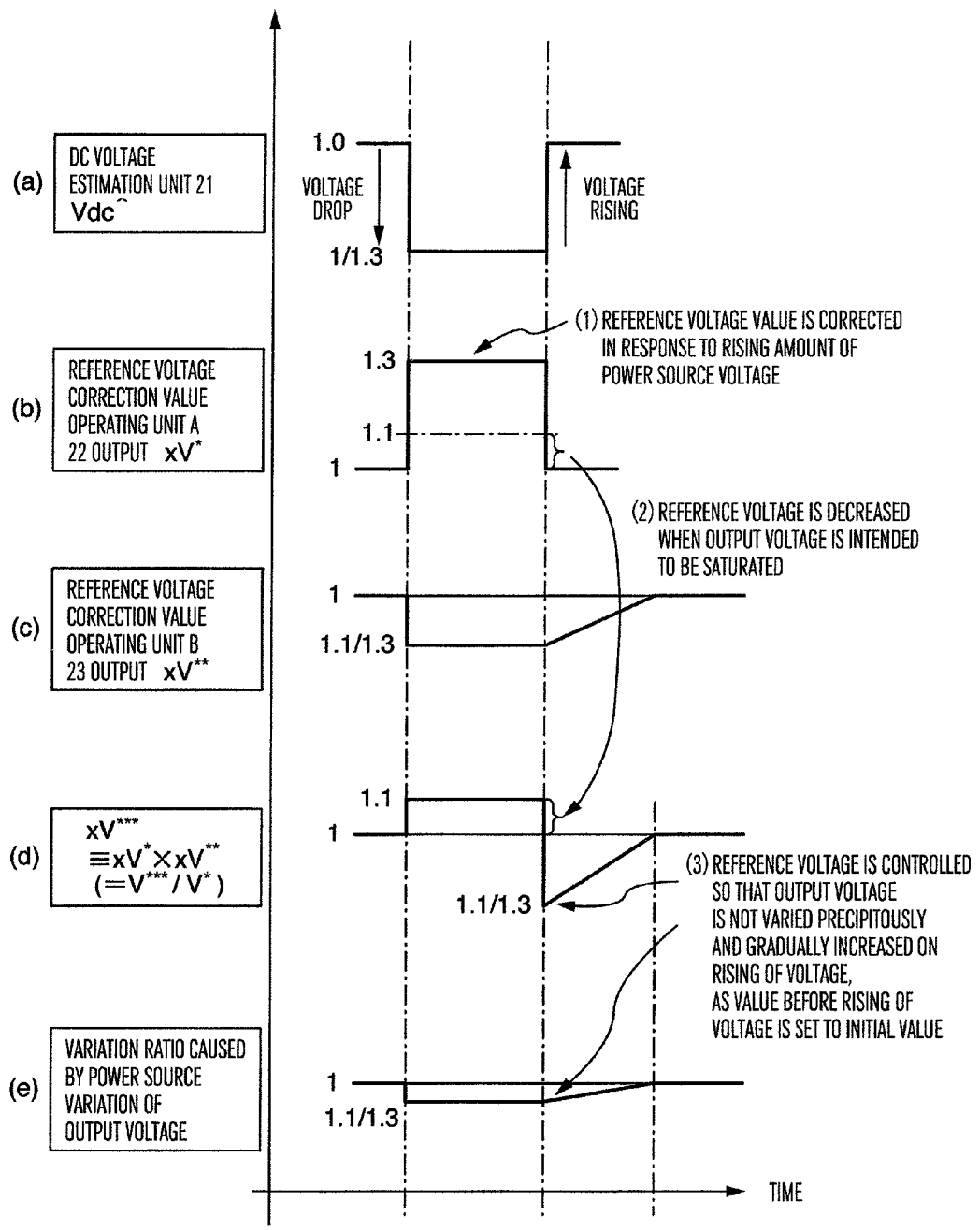
FIG. 2 is a diagram showing waveforms use for a reference voltage correction in relation to the first embodiment.
Figure 3:
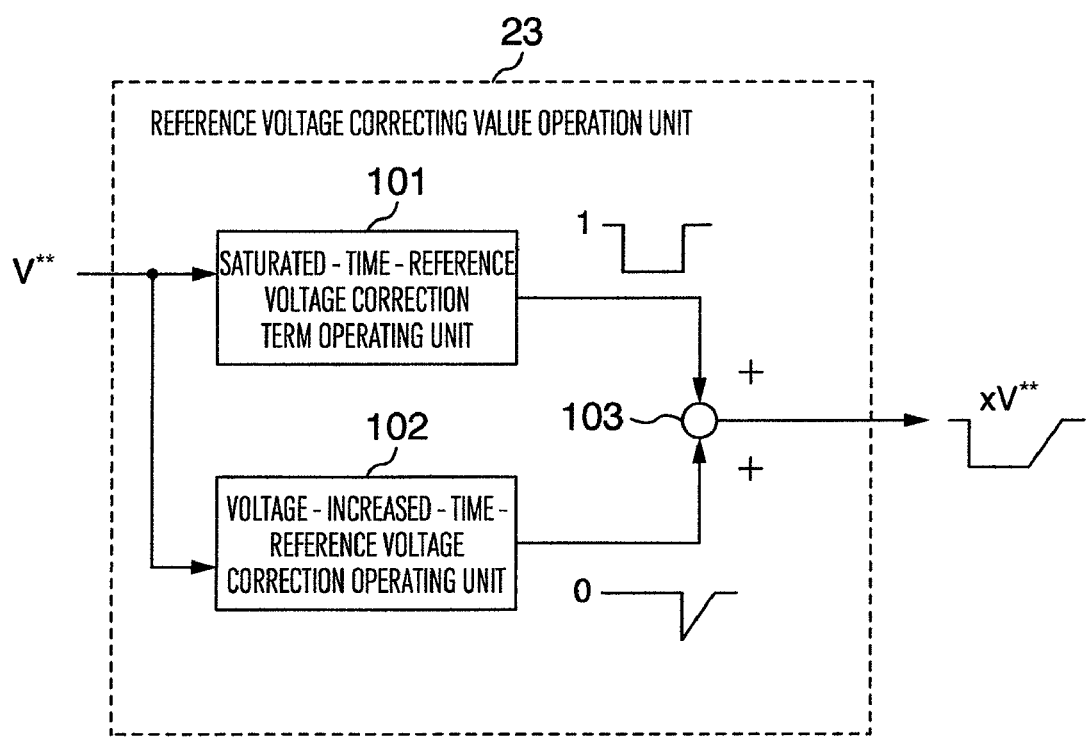
FIG. 3 is a diagram showing a reference voltage correction value operating unit B 23 in relation to the first embodiment.
Figure 8:
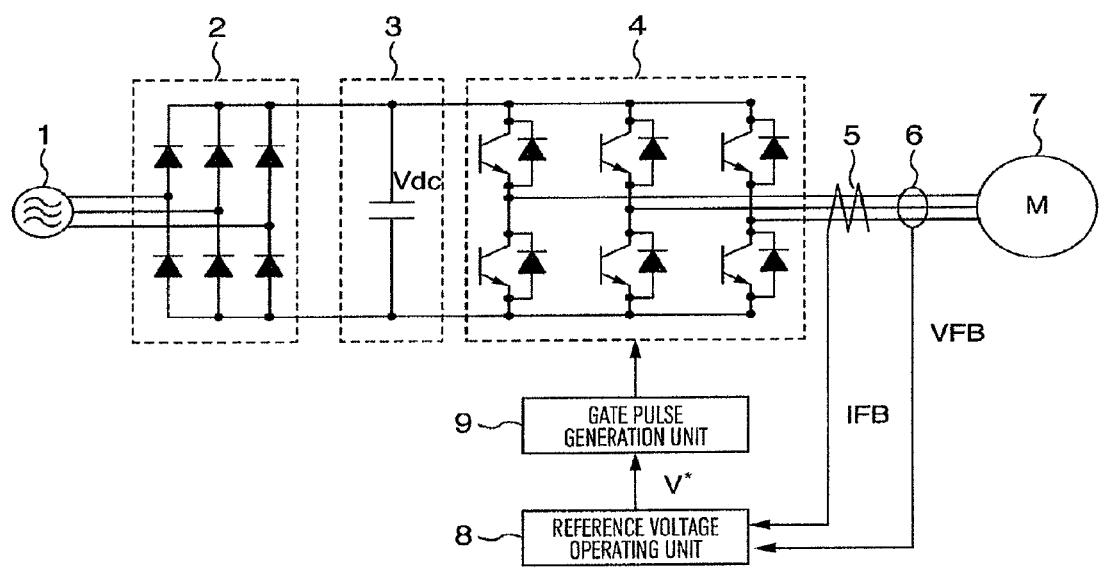
FIG. 8 is a constitutional diagram of an electric power converter apparatus in related art.
Figure 9A:
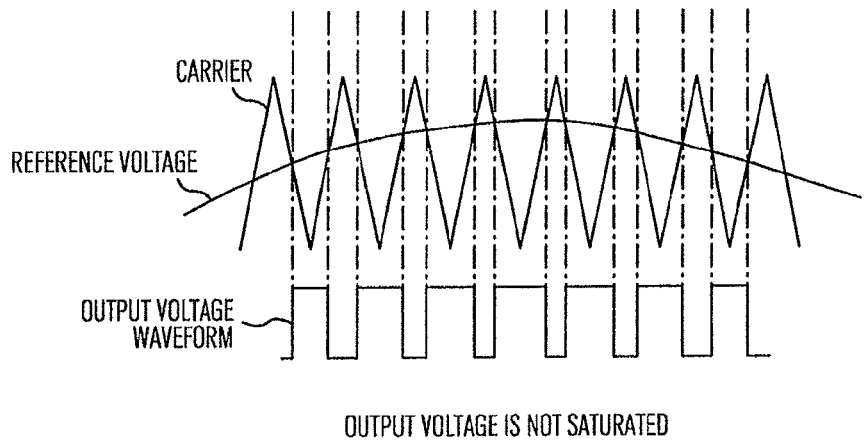
FIGS. 9A and 9B are diagrams showing waveforms of output voltages in which one is saturate and the other is not saturated.
Figure 9B:
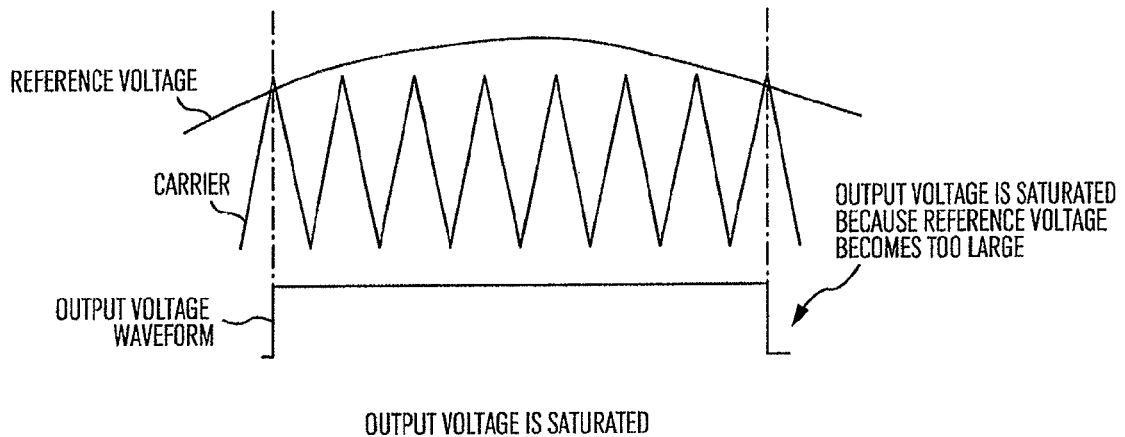

Description relative to different portions from the related system shown in FIG. 8 will be concerned with an electric power converter apparatus in the invention with use of FIG. 1 to FIG. 4. FIG. 1 is an overall view of the electric power converter apparatus, FIG. 2 is a diagram showing an operation, and FIG. 3 is a schematic circuit diagram showing a part of the apparatus in the embodiment. FIGS. 4A and 4B are simulation results showing currents on a power source variation of related art and the present invention, respectively. In FIG. 1, a reference voltage correcting unit 10 is provided between a reference voltage operating unit 8 and a gate pulse generation unit 9. The inside of reference voltage correcting unit 10 will be described below. A DC voltage estimation unit 21 calculates a DC voltage estimation value Vdcˆ by using an inverter output voltage detected value VFB and a final reference voltage value V* (FIG. 2(a)). FIG. 2 indicates, as one example, that the power source voltage drops from a rating (one time) to 1/1.3 times, and then returns to one time. For example, Vdcˆ is calculated by using |VFB|/|V*| which is a ratio of magnitude of VFB and V***, as indicated by expression (1). In addition, the magnitude means a value proportional to a square root of sum of squares for the respective amounts.

$$Vdc\hat{} = |VFB|/|V^{***}| \times Vdc \text{ rating value} \quad (1)$$

A reference voltage correction value operating unit A 22 calculates a reference voltage correcting value xV* for maintaining the output voltage constant by using Vdcˆ (FIG. 2(b)). For example, xV* is set by expression (2), and xV*=1.3 in the case of FIG. 2(b).

$$xV^* = Vdc \text{ rating value}/Vdc\hat{} \quad (2)$$

A reference voltage correcting unit A 24 corrects a reference voltage V* by using xV* to calculate a reference voltage V**. This makes the reference voltage V* to be set to [power source voltage predetermined value (Vdc rating value in this embodiment)/detected power source voltage (Vdcˆ in this embodiment)] times, so that the reference voltage is corrected in response to increase and decrease of the power source voltage and the output voltage is maintained constant.

Next, in a reference voltage correction value operating unit B 23, V becomes larger than a predetermined value (substantially, maximum output voltage) when the power source voltage drops, therefore, the operating unit B 23 outputs a correction amount xV for correcting V decreasingly so that the output voltage is not saturated when it is intended to be saturated (FIG. 2(c)). In FIG. 2(c), the reference voltage value at the saturation is set to xV=1.1/1.3 so that it becomes the aforementioned substantially predetermined value by estimating that V* could exceed the predetermined value (substantially, the maximum output voltage) and be saturated, when V* becomes 1.1 times. Further, xV which is of immediately before voltage increase is set to as an initial value and then gradually increased for preventing the output voltage from precipitous variation, when the power source voltage is varied from a dropped to a risen condition (FIG. 2(c)). As a specific example, the reference voltage correction value operating unit B 23 calculates xV as shown in FIG. 3. In FIG. 3, in the case where a magnitude |V| of V becomes larger than the substantially maximum output voltage in a saturated-time-reference voltage correction term operating unit 101, this operating unit 101 judges that the output voltage could be saturated and outputs a maximum output voltage/|V| (or becomes 1 when it is not saturated). Further, in the case where V drops in a voltage-increased-time-reference voltage correction term operating unit 102, this operating unit 102 judges that the voltage increases when V drops, for example, and outputs a corrected amount which is the same as a dropped amount corrected by the saturated-time-reference voltage correction term operating unit 101. The operating unit 102 then sets the corrected amount to 0 in response to a predetermined rate of change. This predetermined rate of change may be of a predetermined time constant or a stepwise changed ratio. In addition, an excess current is prevented by making the rate of change slower than the rate of change in the increase of Vdcˆ without generating a precipitous potential difference between the inverter and electric motor. A reference voltage correction term operating unit 103 calculates xV with a sum of the outputs from the operating units 101 and 102. A reference voltage correcting unit B 25 in FIG. 1 calculates a final reference voltage value V* by using V and xV**.

Here, a product xV*** of xV* and xV** becomes a correction term for the case where V* is converted directly into V* (FIG. 2(d)). xV* is increased in response to the dropped amount when the voltage drops, however, corrected decreasingly so that xV* is not saturated when the output voltage is intended to be saturated because the increased amount is large. In FIG. 2(d), xV* becomes 1.1 or xV*=1.1 since xV* is saturated when it is larger than 1.1 times. This makes the output voltage to be decreased to 1.1/1.3 times which is stated before variation (FIG. 2(e)). Further, when the power source voltage is returned from the dropped condition, xV*** becomes 1 gradually increased from 1.1/1.3 as an initial value (FIG. 2(d)), and the output voltage increases gradually from a value before increasing the power source voltage as an initial value, without precipitously varying the output voltage (FIG. 2(e)).

Figure 4B:
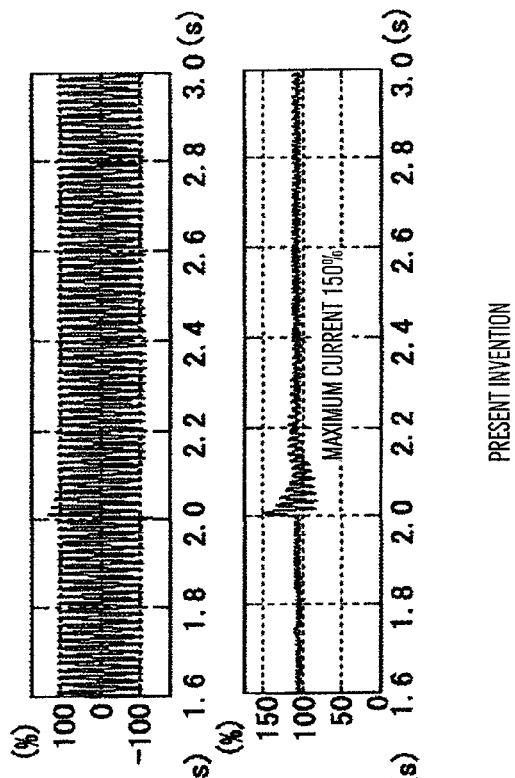

As described above, the reference voltage is corrected for maintaining the output voltage constant in the embodiment. However, the saturation for the output voltage is prevented by controlling decreasingly the reference voltage when the output voltage is intended to be saturated on the drop of voltage. After that, the output voltage is continuously increased on the rising of voltage. Therefore, an excess current and torque pulsation do not generate, though they are generated in the related system having a problem as described above. FIG. 4 shows a simulation result of currents when a DC voltage is varied from 80% to 110% by causing the power source variation in order to explain advantages of the invention. In the case of related system (FIG. 4A), the current flows 250% against the rating value, in contrast, the current can be reduced to 150% by using the present invention (FIG. 4B).

Embodiment 2

Next, a second embodiment of the invention will be described with different features from the aforementioned first embodiment. In the first embodiment, xV* and xV** are calculated individually and added up to V*, respectively, to obtain the final reference voltage V***. Alternatively, a product is obtained directly from xV*×xV, and V* may be calculated directly from V*. Further, xV* and xV** are obtained as a correction ratio for V*, and a correction term may be obtained by adding the correction ratio to V* instead of multiplying V* by the correction ratio xV* and xV**. Furthermore, V* and V may be AC or a DC reference voltage value controlled by a vector to generally defined d axis and q axis. In the case where V* is a DC voltage of d and q axes, V*** is converted to AC in the coordinates as an output. The second embodiment can obtain the same advantages as those of the first embodiment.

Embodiment 3

Figure 5:
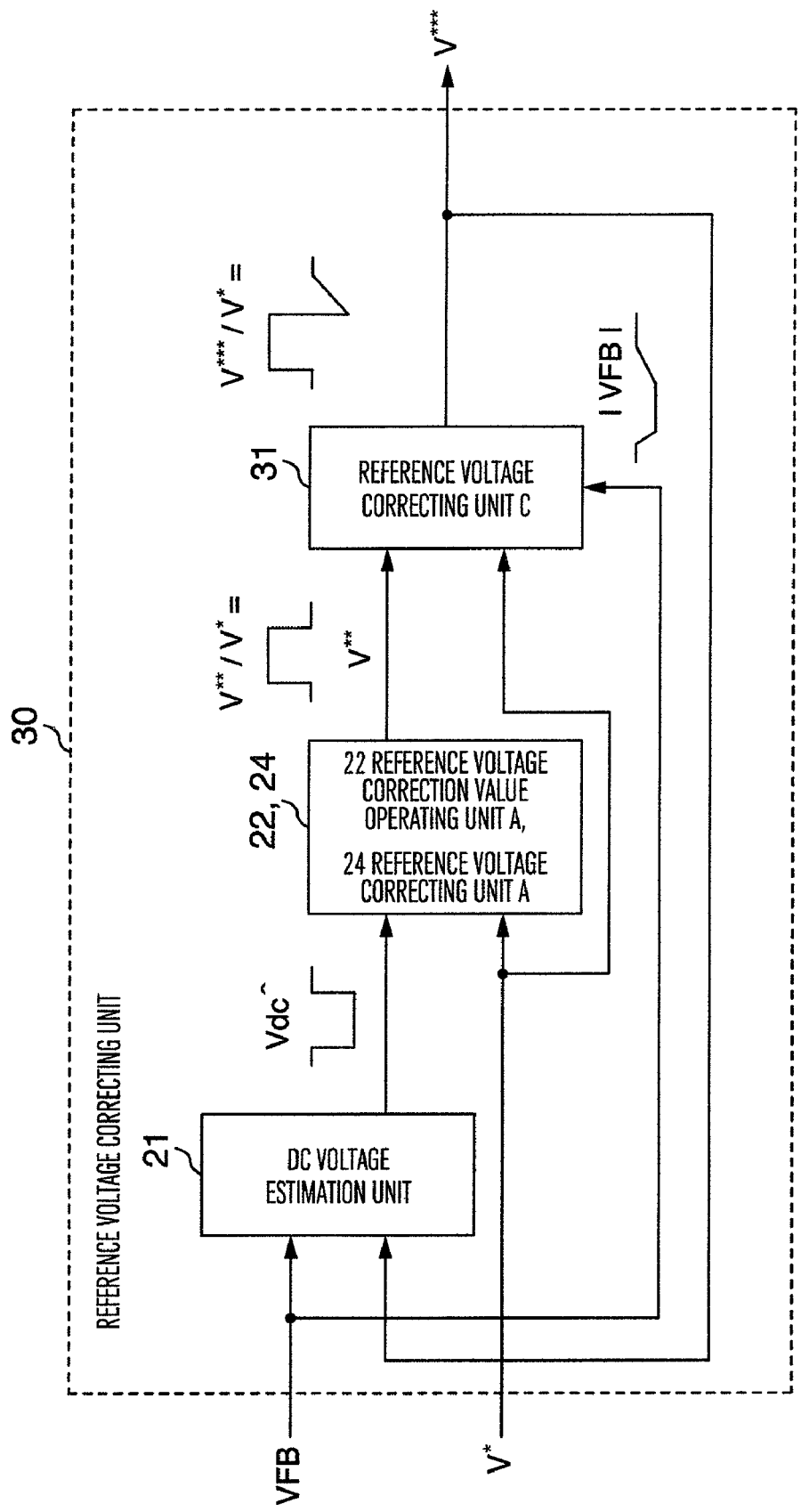
FIG. 5 is a diagram showing a part of a reference voltage correcting unit in the third embodiment.

Next, an operation of a reference voltage correcting unit 30 will be described with reference to FIG. 5 as a third embodiment of the invention. In this embodiment, the power source voltage estimation and reference voltage calculation are carried out as described in the first embodiment, that is, the reference voltage V for maintaining the output voltage constant is calculated by using the DC voltage estimation unit 21, reference voltage correction value operating unit A 22, and reference voltage correcting unit A 24. The reference voltage correcting unit C 31 decreases the reference voltage V so that the output voltage is not saturated on the drop of power source voltage. As feature different from the first embodiment, the reference voltage correcting unit C 31 corrects V so that |VFB| immediately before voltage increase is set to an initial value on the rising of power source voltage, after that, the output voltage is increased gradually, and the reference voltage correcting unit C 31 then outputs V*. A rate of change for the voltage increase is acceptable if it is slower than that for the voltage increase of Vdcˆ.

As described above, this embodiment has a feature so that the output voltage is varied continuously on the rising of power source voltage, by using the voltage detected value VFB. In the same way as the first embodiment, the saturation of output voltage is prevented on the dropping of power source voltage, and the precipitous variation of output voltage is prevented on the rising of power source voltage, so that it is advantageous that the excess current and torque pulsation are prevented by the invention.

Embodiment 4

Figure 6:
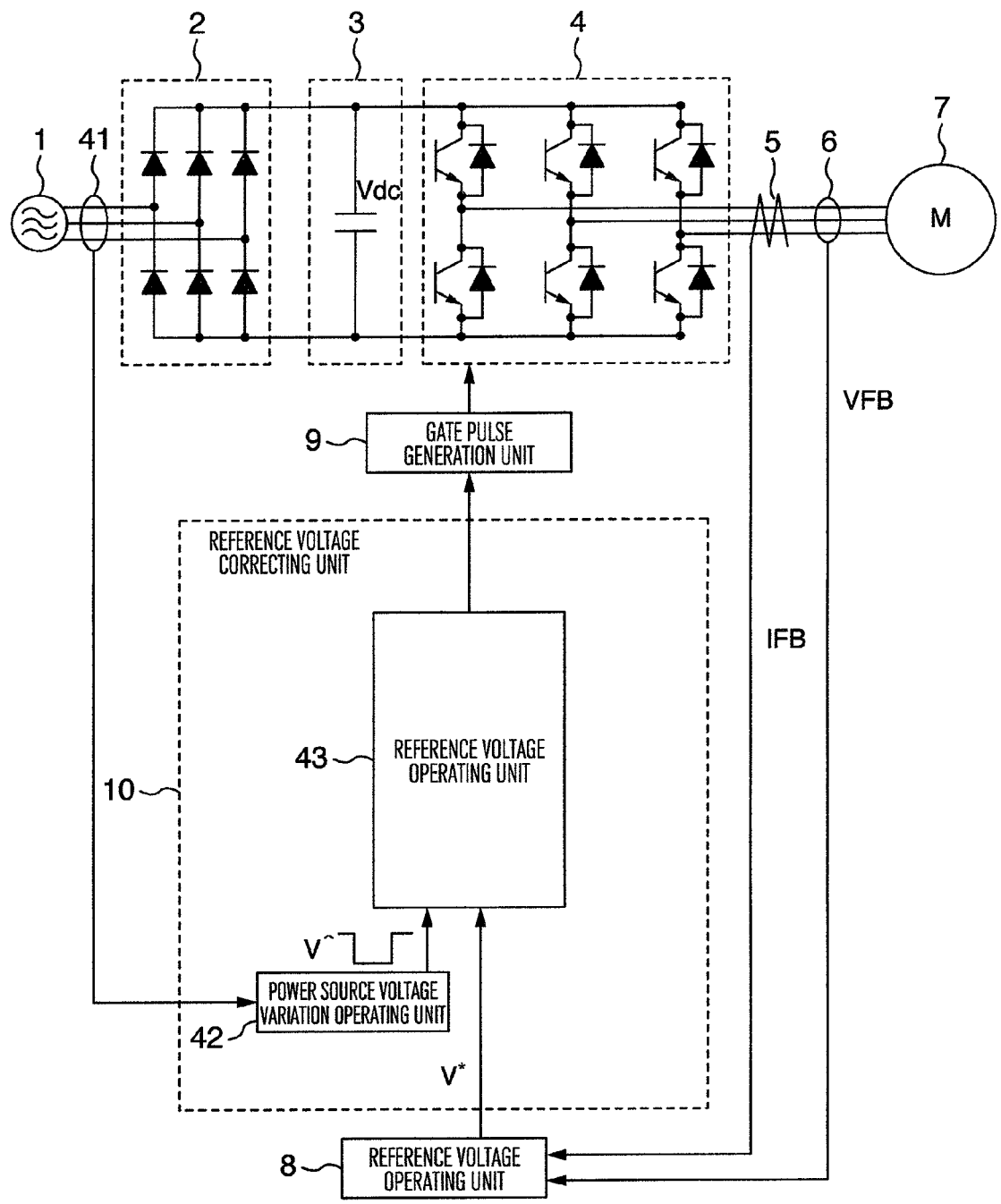
FIG. 6 is a constitutional diagram of an electric power converter apparatus in the fourth embodiment.

A fourth embodiment of the invention will be described with different features from the aforementioned first embodiment. FIG. 6 shows a voltage detector 41 to detect voltages of the commercial power source 1. A power source voltage variation operating unit 42 in the reference voltage correcting unit 10 detects a commercial power source variation by using the voltage detected value. In this embodiment, assuming that Vdc is varied in proportional to the variation of detected commercial power source, a reference voltage operating unit 43 carries out the same control as the first embodiment, so that it is advantageous to prevent the output voltage from an excess current on the power source variation in the same advantage of the first embodiment. In addition, the same advantage can also be obtained by detecting Vdc directly without detecting the commercial power source voltage.

Embodiment 5

Figure 7:
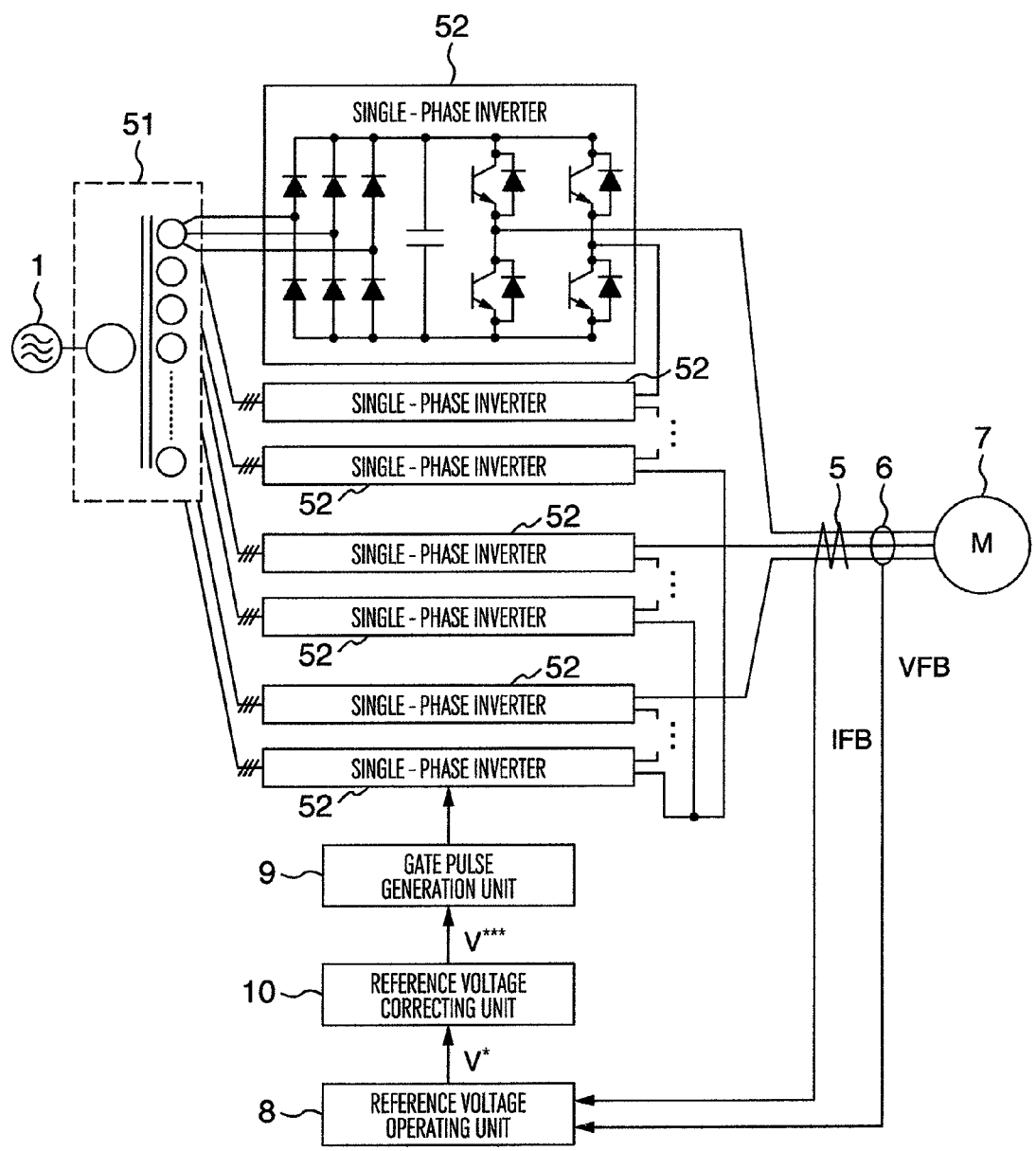
FIG. 7 is a constitutional diagram of an electric power converter apparatus in the fifth embodiment.

A fifth embodiment of the invention will be described with different features from the aforementioned first embodiment. FIG. 7 shows a multiple electric power converter apparatus connected in multiplex with single-phase inverters 52 by using a multiple winding transformer 51. One or more single-phase inverters 52 can be installed on every phase. Further, in the same way of the first embodiment, the reference voltage V* is calculated in response to the variation of DC voltage caused by voltage variation. In addition, an average value of Vdcˆ is detected by using VFB to control V*. The power source variation may be detected from the voltage detected value of commercial power source 1 as described in the third embodiment. All or plural Vdc voltages may be detected directly to use for the calculation of V***. As described above, the first embodiment indicates the constitution of two-level inverter having three-phase output, and the multiple electric power converter apparatus in this embodiment can also obtain the same advantages as those of the first embodiment by applying the present invention to this embodiment. Further, alternatively, a converter apparatus converts the power source voltage into an AC voltage having an arbitrary frequency, which can be applied for the neutral point clamped type three-level inverter, matrix converter, etc. The AC-DC converter unit is illustrated as a diode operated rectification in FIG. 7, however, a converter with switching devices may also be used. Further, IGBTs are also illustrated as switching devices in FIG. 7, alternatively, switching devices used for the power electronics system such as GTO and SiC may also be used to obtain the same advantages as described above.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An electric power converter apparatus comprising:
   a converter unit which converts a power source voltage from a power source into an AC voltage having an arbitrary frequency and outputs the AC voltage; and
   a control unit which controls the AC voltage output substantially at a constant level using an output reference voltage value corrected in accordance with a variation of the power source voltage,
   wherein, when the power source voltage decreases, the output reference voltage value is increased so as to suppress decreasing of the AC voltage,
   wherein, when the power source voltage decreases to be equal to or less than a predetermined value, the increased output reference voltage value is decreased, and
   wherein, when the power source voltage increases, the decreased output reference voltage value is gradually increased so as to avoid undesirable rapid increasing of the AC voltage.

2. The apparatus according to claim 1, wherein, when the decreased output reference voltage value is gradually increased, the decreased output reference voltage value is increased so as to increase the AC voltage in a predetermined rate of change, and an initial value of decreasing the output reference voltage value is set to a value of the output reference voltage used at a time before the power source voltage increases.

3. The apparatus according to claim 2, wherein the predetermined rate of change is of a predetermined time constant or a stepwise changed ratio.

4. The apparatus according to claim 1, wherein the AC voltage output is decreased when the AC voltage drops to equal to or less than a predetermined value, and afterward, the AC voltage output is increased in response to a predetermined rate of change when the power source voltage rises, which indicates that the output reference voltage value is decreased to an equal to or less than the predetermined value when the power source voltage drops to an equal to or less than the predetermined value and the output reference voltage value rises to equal to or less than the predetermined value, afterward, the output reference voltage value is set so that the output reference voltage value becomes a value before the power source voltage rises when the power source voltage increases, and the output reference voltage value is increased in response to the predetermined rate of change.

5. The apparatus according to claim 1, wherein the power source is an AC power source.

6. The apparatus according to claim 1, wherein, when the power source voltage decreases to be equal to or less than the predetermined value, which indicates that a DC voltage is equal to or less than the predetermined value; and when the power source voltage rises, which indicates a time when the DC voltage is increased.

7. The apparatus according to claim 6, wherein the DC voltage is detected directly from the power source.

8. The apparatus according to claim 1, wherein:
when the power source voltage decreases to be equal to or less than the predetermined value, which indicates that a DC voltage estimation value is equal to or less than the predetermined value, and
when the power source voltage increases, which indicates a time when the DC voltage estimation value is increased.

9. The apparatus according to claim 8, wherein the DC voltage estimation value is obtained from a ratio of an output AC voltage value and the output reference voltage value.

10. The apparatus according to claim 1, wherein the converter unit comprises:
a diode unit arranged to rectify the power source voltage from the power source and convert to a DC voltage, via a smoothing capacitor; and
an inverter unit arranged to convert the DC voltage into the AC voltage that is proportional to a product of the output reference voltage value and the DC voltage, and to output the AC voltage.

11. The apparatus according to claim 1, wherein the control unit comprises:
a reference voltage operation unit arranged to calculate the output reference voltage value in response to a desired command value using a current and a voltage detected from the AC voltage;
a gate pulse generation unit arranged to compare the output reference voltage value with a carrier waveform and generate pulse width modulation (PWM) gate pulses so as to control the conversion of the power source voltage into the AC voltage; and
a reference voltage correction unit disposed between the reference voltage operation unit and the gate pulse generation unit, to correct the output reference voltage value in accordance with the variation of the power source voltage.

12. The apparatus according to claim 11, wherein the reference voltage correction unit comprises:
a DC voltage estimation unit arranged to calculate a DC voltage estimation value using an inverted voltage detected from the AC voltage and a final reference voltage value;
a correction value operation unit arranged to calculate a correction value for maintaining the AC voltage constant using the DC voltage estimation value; and
a correction unit arranged to correct the output reference voltage value using the correction value and a preset correction value so that the AC voltage output is not varied precipitously and gradually increased on rising of voltage.

13. A multiple electric power converter apparatus comprising:
a multiple winding transformer arranged to transform a power source voltage;
a plurality of single-phase inverters arranged in parallel and coupled to the multiple winding transformer at every phase of the power source voltage, to convert the power source voltage into an AC voltage having an arbitrary frequency and output the AC voltage so as to drive an electric motor; and
a control unit arranged to maintain the AC voltage constant using an output reference voltage value corrected in accordance with variations of the power source voltage,
wherein, when the power source voltage decreases, the output reference voltage value is increased so as to suppress decreasing of the AC voltage,
wherein, when the power source voltage decreases to be equal to or less than a predetermined value, the increased output reference voltage value is decreased, and
wherein, when the power source voltage increases, the decreased output reference voltage value is gradually increased so as to avoid undesirable rapid increasing of the AC voltage.

14. The apparatus according to claim 13, wherein the control unit comprises:
a reference voltage operation unit arranged to calculate the output reference voltage value in response to a desired command value using a current and a voltage detected from the AC voltage;
a gate pulse generation unit arranged to compare the output reference voltage value with a carrier waveform and generate pulse width modulation (PWM) gate pulses so as to control the conversion of the power source voltage into the AC voltage; and
a reference voltage correction unit disposed between the reference voltage operation unit and the gate pulse generation unit, to correct the output reference voltage value in accordance with the variation of the power source voltage.

15. The apparatus according to claim 14, wherein the reference voltage correction unit comprises:
a DC voltage estimation unit arranged to calculate a DC voltage estimation value using an inverted voltage detected from the AC voltage and a final reference voltage value;
a correction value operation unit arranged to calculate a correction value for maintaining the AC voltage constant using the DC voltage estimation value; and
a correction unit arranged to correct the output reference voltage value using the correction value and a preset correction value so that the AC voltage output is not varied precipitously and gradually increased on rising of voltage.

16. A method of controlling an electric power converter apparatus which converts a power source voltage into an output AC voltage having an arbitrary frequency in accordance with an output reference voltage value, the method comprising:
correcting the output reference voltage value in accordance with a variation of the power source voltage;
increasing the output reference voltage value to suppress decreasing of the output AC voltage when the power source voltage decreases;
decreasing the increased output reference voltage value when the power source voltage decreases to be equal to or less than a predetermined value; and
after the decrease of the output reference voltage value, when the power source voltage increases, gradually increasing the decreased output reference voltage value so as to avoid undesirable rapid increasing of the output AC voltage.

* * * * *